United States Patent
Buelte et al.

(10) Patent No.: US 10,553,886 B2
(45) Date of Patent: Feb. 4, 2020

(54) GENERATION OF OXYGEN DEPLETED AIR BY A FUEL CELL SYSTEM

(71) Applicant: Nuvera Fuel Cells, LLC, Billerica, MA (US)

(72) Inventors: Steve Buelte, Billerica, MA (US); Pierre-François Quet, Cambridge, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 710 days.

(21) Appl. No.: 15/208,148

(22) Filed: Jul. 12, 2016

(65) Prior Publication Data

US 2017/0018792 A1  Jan. 19, 2017

Related U.S. Application Data

(60) Provisional application No. 62/191,988, filed on Jul. 13, 2015.

(51) Int. Cl.
*H01M 8/0444* (2016.01)
*H01M 8/04746* (2016.01)
(Continued)

(52) U.S. Cl.
CPC ..... *H01M 8/04753* (2013.01); *H01M 8/0444* (2013.01); *H01M 8/04895* (2013.01);
(Continued)

(58) Field of Classification Search
CPC ........... H01M 8/04753; H01M 8/0441; H01M 8/0444; H01M 8/04552; H01M 8/04582;
(Continued)

(56) References Cited

U.S. PATENT DOCUMENTS 6,461,751 B1 * 10/2002 Boehm ............. H01M 8/04089
429/432
2007/0259227 A1 * 11/2007 Oishi ................ H01M 8/04007
429/442
(Continued)

FOREIGN PATENT DOCUMENTS

EP  1 505 385 A1  2/2005

OTHER PUBLICATIONS

PCT International Search Report and Written Opinion dated Jan. 25, 2018, in PCT/US20160/41884, 18 pages.
(Continued)

*Primary Examiner* — Amy Cohen Johnson
*Assistant Examiner* — Paul D Baillargeon
(74) *Attorney, Agent, or Firm* — Finnegan, Henderson, Farabow, Garrett & Dunner, LLP

(57) ABSTRACT

The present disclosure is directed to a fuel cell system for generating oxygen depleted air. The fuel cell system may include a fuel cell having an anode, a cathode, and an electrolyte positioned between the anode and the cathode. The cathode may be configured to receive an air flow and discharge an oxygen depleted air flow. The fuel cell system may further include a sensor configured to generate a first signal indicative of a presence of hydrogen in the oxygen depleted air flow and a controller in communication with the sensor and the fuel cell. The controller may be configured to detect the presence of hydrogen in the oxygen depleted air flow based on the first signal, and in response to detecting the presence of hydrogen in the oxygen depleted air flow, selectively cause a current density of the fuel cell to decrease and/or increase a flow rate of the air flow to the cathode.

17 Claims, 7 Drawing Sheets

(51) Int. Cl.
    *H01M 8/04858*     (2016.01)
    *H01M 8/1007*     (2016.01)
    *H01M 8/1018*     (2016.01)

(52) U.S. Cl.
    CPC ....... *H01M 8/1007* (2016.02); *H01M 8/1018* (2013.01); *H01M 2008/1095* (2013.01)

(58) Field of Classification Search
    CPC ......... H01M 8/04761; H01M 8/04805; H01M 8/04895; H01M 8/04902; H01M 8/0491
    See application file for complete search history.

(56) References Cited

U.S. PATENT DOCUMENTS

| | | | |
|---|---|---|---|
| 2011/0143241 A1 | 6/2011 | Tighe et al. | |
| 2015/0017557 A1* | 1/2015 | Hoffjann | H01M 8/0662 429/410 |

OTHER PUBLICATIONS

PCT Invitation to Pay Additional Fees with Annex to Form relating to results of a partial international search, issued in Application No. PCT/US2016/041884, dated Sep. 8, 2016, 7 pages.

* cited by examiner

GENERATION OF OXYGEN DEPLETED AIR BY A FUEL CELL SYSTEM

This application claims the benefit of U.S. Provisional Application No. 62/191,988, filed Jul. 13, 2015, which is incorporated by reference in its entirety.

The present disclosure is directed towards generation of oxygen depleted air, and more specifically, generation of oxygen depleted air by a fuel cell system.

Fuel cells, usually classified as electrochemical cells or electrolysis cells, are devices used for generating current from chemical reactions, or inducing a chemical reaction using a flow of current. A fuel cell converts the chemical energy of a fuel (e.g., hydrogen, natural gas, methanol, gasoline, etc.) and an oxidant (air or oxygen) into electricity and waste products of heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms can electrochemically split into electrons and protons (hydrogen ions) at the anode. The electrons flow through a circuit to the cathode and generate electricity, while the protons diffuse through the electrolyte membrane to the cathode. At the cathode, protons can react with electrons and oxygen that are supplied to the cathode to produce water and heat.

The reactions taking place at the anode and the cathode of a hydrogen PEM fuel cell can be expressed as chemical equations, as shown below.

Anode oxidation reaction: $2H_2 \rightarrow 4H^+ + 4e^-$

Cathode reduction reaction: $4H^+ + 4e^- + O_2 \rightarrow 2H_2O$

Overall electrochemical reaction: $2H_2 + O_2 \rightarrow 2H_2O$

Hydrogen PEM fuel cells can be used to generate oxygen depleted air. When an air flow is supplied as an oxidizer to the cathode, oxygen in the air flow is consumed by the electrochemical reaction at the cathode as shown in the above chemical equations. Thus, the amount of oxygen in the output air flow discharged from the cathode compared to that of the air flow supplied to the cathode is reduced. Thus the output air flow discharged from the cathode is an oxygen depleted air flow. The oxygen depleted air flow may be utilized for various applications. For example, the oxygen depleted air may be supplied to systems for suppressing fire, slowing oxidation or degradation of artifacts and objects, or preserving food from deterioration. Applications utilizing oxygen depleted air to suppress fire can be found in a variety of settings where oxygen depleted air can be circulated into an enclosed environment, such as an aircraft cargo bay, building, rooms with electronic equipment (e.g. servers, data centers), large warehouses, or document storages.

To use the oxygen depleted air generated from a fuel cell to suppress or extinguish fire, it is optimal to reduce the amount of oxygen in the oxygen depleted air to a minimum to reduce the amount of oxidizer available for combustion. Due to design and water management issues of a fuel cell, the oxygen in the air flow supplied to the cathode of the fuel cell should exceed the oxygen consumed by the electrochemical reactions. Thus, an amount of unconsumed oxygen remains in the oxygen depleted air flow discharged from the cathode, but to reduce the amount of oxygen remaining in the oxygen depleted air flow, it is desirable to supply the cathode with the minimum excess of oxygen.

It is also desirable to be able to generate a volume of oxygen depleted air from the fuel cell in a limited period of time. Typically, the volumetric flow rate of oxygen depleted air discharged from the cathode increases as the current density of the fuel cell increases. Thus, to increase the volume of oxygen depleted air generated from the electrochemical reactions in the fuel cell in a limited period of time, it is desirable to increase the current density of the fuel cell to a maximum.

To generate high quality oxygen depleted air (e.g., minimal oxygen content) in a high volumetric flow rate from a fuel cell, it is desirable to supply to the cathode a minimum air flow rate and to operate the fuel cell at a highest current density. One challenge for operating a fuel cell or fuel cells arranged in a stack, for example, under these extreme conditions is decreased voltage of the fuel cell due to lack of oxygen. The decreased voltage of the fuel cell may result in hydrogen transportation from the anode to the cathode under electrochemical forces, sometimes referred to as hydrogen pumping. Hydrogen gas is extremely flammable and therefore not suitable to be present in the oxygen depleted air when used for fire suppression.

Therefore, there is a need for an improved fuel cell system and method of controlling the system that reliably and consistently generates oxygen depleted air from the cathode and limits and/or prevents the presence of hydrogen in the output air flow of the cathode.

In consideration of the aforementioned circumstances, the present disclosure is directed toward a fuel cell system for generating an oxygen depleted air and method of controlling the system.

In one aspect, the present disclosure is directed to a fuel cell system. The fuel cell system may include a fuel cell having an anode, a cathode, and an electrolyte positioned between the anode and the cathode. The cathode may be configured to receive an air flow and discharge an oxygen depleted air flow. The fuel cell system may also include a sensor configured to generate a first signal indicative of a presence of hydrogen in the oxygen depleted air flow and a controller in communication with the sensor and the fuel cell. The controller may be configured to detect the presence of hydrogen in the oxygen depleted air flow based on the first signal, and in response to detecting the presence of hydrogen in the oxygen depleted air flow, selectively cause a current density of the fuel cell to decrease and/or increase a flow rate of the air flow to the cathode. The controller may also be configured to regulate a concentration of oxygen in the oxygen depleted air flow by regulating the flow rate of the air flow to the cathode. The controller may be further configured to regulate a volumetric flow rate of the oxygen depleted air flow by regulating the current density of the fuel cell. The controller may be configured to determine a maximum value for the current density of the fuel cell by increasing the current density until the presence of hydrogen is detected in the oxygen depleted air flow. The controller may be configured to determine a minimum value for the flow rate of the air flow to the cathode by decreasing the flow rate until the presence of hydrogen is detected in the oxygen depleted air flow. The fuel cell system may further include a detector configured to generate a second signal indicative of a voltage value of the fuel cell. The detector may be in communication with the controller. The controller may be configured to regulate the current density of the fuel cell so that the voltage value of the fuel cell, or a plurality of fuel cells, or the fuel cell stack remains above a minimum set point. The controller may be configured to regulate the flow rate of the air flow to the cathode so the voltage value of the fuel cell remains above a minimum set point. The controller may also be configured to regulate the current density of the fuel cell and the flow rate of the air flow to the cathode so that the voltage value of the fuel cell remains above a minimum set point. The electrolyte may be a proton exchange membrane and the presence of hydrogen may indicate the formation of a hole in the proton exchange membrane. The oxygen depleted air flow may be supplied to a fire suppression system. The controller may be configured to run a feedback control scheme, utilizing at least one of Proportional-Integral-Derivative control, adaptive control, optimal control, model predictive control, nonlinear control, and intelligent control. The controller may further be configured to adaptively regulate drying of the fuel cell based on the first signal. The fuel cell system may include a plurality of the fuel cells arranged in a stack.

In another aspect, the present disclosure is directed to a method of generating an oxygen depleted air flow. The method may include supplying an air flow to a cathode of a fuel cell. The air flow may be transformed to an oxygen depleted air flow by electrochemical reactions in the fuel cell. The method may also include detecting a presence of hydrogen in the oxygen depleted air flow discharged from the cathode. The method may further include controlling a current density of the fuel cell and/or a flow rate of the air flow to the cathode based on the detected presence of hydrogen in the oxygen depleted air flow. The method may include controlling a concentration of oxygen in the oxygen depleted air flow by controlling the flow rate of the air flow to the cathode. The method may include controlling a volumetric flow rate of the oxygen depleted air flow by controlling the current density of the fuel cell. The method may further include determining a maximum value for the current density of the fuel cell by increasing the current density until the presence of hydrogen is detected in the oxygen depleted air flow. The method may further include determining a minimum value for the flow rate of the air flow to the cathode by decreasing the flow rate until the presence of hydrogen is detected in the oxygen depleted air flow. The method may also include detecting a voltage value of the fuel cell. The method may include regulating the current density of the fuel cell so that the voltage value remains above a minimum set point. The method may include regulating the flow rate of the air flow to the cathode so that the voltage value remains above a minimum set point. The method may include regulating the current density of the fuel cell and the flow rate of the air flow so that the voltage value remains above a minimum set point. The method may include supplying the oxygen depleted air flow to a fire suppression system. The method may include performing a feedback control scheme utilizing at least one of a Proportional-Integral-Derivative control, adaptive control, optimal control, model predictive control, nonlinear control, and intelligent control. The method may include adaptively regulating drying of the fuel cell based on the presence of hydrogen detected.

In another aspect, the present disclosure is directed to a fuel cell system. The fuel cell system may include a fuel cell having an anode, a cathode, and an electrolyte positioned between the anode and the cathode, the cathode configured to receive an air flow and discharge an oxygen depleted air flow. The fuel cell system may also include a detector configured to generate a first signal indicative of a voltage value of the fuel cell and a controller in communication with the detector and the fuel cell. The controller may be configured to measure the voltage value of the fuel cell based on the first signal and in response to the voltage value, selectively regulate a current density of the fuel cell and/or a flow rate of the air flow to the cathode. The controller may also be configured to regulate a concentration of oxygen in the oxygen depleted air flow by regulating the flow rate of the air flow to the cathode. The controller may also be configured to regulate a volumetric flow rate of the oxygen depleted air flow by regulating the current density of the fuel cell. The controller may be further configured to regulate a voltage value of the fuel cell above a minimum set point by regulating the current density of the fuel cell. The controller may be further configured to regulate a voltage value of the fuel cell above a minimum set point by regulating the flow rate of the air flow to the cathode. The controller may be further configured to regulate a voltage value of the fuel cell above a minimum set point by regulating the current density of the fuel cell and the flow rate of the air flow to the cathode. The fuel cell system may also include a sensor configured to generate a second signal indicative of presence of hydrogen in the oxygen depleted air flow, wherein the sensor is in communication with the controller. The controller may be further configured to detect the presence of hydrogen in the oxygen depleted air flow based on the second signal and in response to detecting the presence of hydrogen in the oxygen depleted air flow, selectively cause the current density of the fuel cell to decrease and/or increase the flow rate of the air flow to the cathode.

In another aspect, the present disclosure is directed to a method of generating an oxygen depleted air flow. The method may include supplying an air flow to a cathode of a fuel cell. The air flow may be transformed to an oxygen depleted air flow by electrochemical reactions in the fuel cell. The method may also include detecting a voltage value of the fuel cell and controlling a current density of the fuel cell and/or a flow rate of the air flow to the cathode based on the voltage value detected. The method may also include controlling a concentration of oxygen in the oxygen depleted air flow by controlling the flow rate of the air flow to the cathode. The method may also include controlling a volumetric flow rate of the oxygen depleted air flow by controlling the current density of the fuel cell. The method may also include regulating the current density of the fuel cell so that the voltage value remains above a minimum set point. The method may further include regulating the flow rate of the air flow to the cathode so that the voltage value remains above a minimum set point. The method may further include regulating the current density of the fuel cell and the flow rate of the air flow to the cathode so that the voltage value remains above a minimum set point. The method may further include sensing a second signal indicative of presence of hydrogen in the oxygen depleted air flow when the voltage value of the fuel cell is lower than a minimum threshold. The method may further include detecting the presence of hydrogen in the oxygen depleted air flow based on the second signal and controlling the current density of the fuel cell and/or the flow rate of the air flow to the cathode based on the detected presence of hydrogen in the oxygen depleted air flow.

In another aspect, the present disclosure is directed to a fuel cell system. The fuel cell system may include a fuel cell having an anode, a cathode, and an electrolyte positioned between the anode and the cathode. The cathode may be configured to receive an air flow and discharge an oxygen depleted air flow. The fuel cell system may also include a detector configured to generate a first signal indicative of a voltage value of the fuel cell. The fuel cell system may include a sensor configured to generate a second signal indicative of presence of hydrogen in the oxygen depleted air flow. The fuel cell system may further include a controller in communication with the detector, the sensor, and the fuel cell. The controller may be configured to measure a voltage value of the fuel cell based on the first signal and in response to the voltage value, selectively regulate a current density of the fuel cell and/or a flow rate of the air flow to the cathode. When the voltage value is lower than a minimum threshold, controller may be configured to detect the presence of hydrogen in the oxygen depleted air flow based on the second signal and in response to detecting the presence of hydrogen in the oxygen depleted air flow, selectively cause the current density of the fuel cell to decrease and/or increase the flow rate of the air flow to the cathode.

In another aspect, the present disclosure is directed to a method of generating an oxygen depleted air flow. The method may include supplying an air flow to a cathode of a fuel cell. The air flow may be transformed to an oxygen depleted air flow by electrochemical reactions in the fuel cell. The method may also include detecting a voltage value of the fuel cell. The method may also include controlling a current density of the fuel cell and/or a flow rate of the air flow to the cathode based on the detected voltage value of the fuel cell. The method may also include detecting a presence of hydrogen in the oxygen depleted air flow discharged from the cathode when the voltage value detected is lower than a minimum threshold. The method may further include controlling a current density of the fuel cell and/or a flow rate of the air flow to the cathode based on the detected presence of hydrogen in the oxygen depleted air flow.

In another aspect, the present disclosure is directed to a fuel cell system. The fuel cell system may include an anode, a cathode, and an electrolyte positioned between the anode and the cathode. The cathode may be configured to receive an air flow and discharge an oxygen depleted air flow. The fuel cell system may also include a sensor configured to generate a first signal indicative of a concentration of oxygen in the oxygen depleted air flow. The fuel cell system may also include a controller in communication with the sensor and the fuel cell. The controller may be configured to regulate a concentration of oxygen in the oxygen depleted air flow by regulating a current density of the fuel cell and/or the flow rate of the air flow to the cathode.

It is to be understood that both the foregoing general description and the following detailed description are exemplary and explanatory only and are not restrictive of the present disclosure as claimed.

The accompanying drawings, which are incorporated in and constitute a part of this specification, illustrate embodiments of the present disclosure and together with the description, serve to explain the principles of the disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The present disclosure is described herein with reference to illustrative embodiments. It is understood that the embodiments described herein are not limited thereto. Those having ordinary skill in the art and access to the teachings provided herein will recognize additional modifications, applications, embodiments, and substitution of equivalents that all fall with the scope of the present disclosure.

Figure 1:
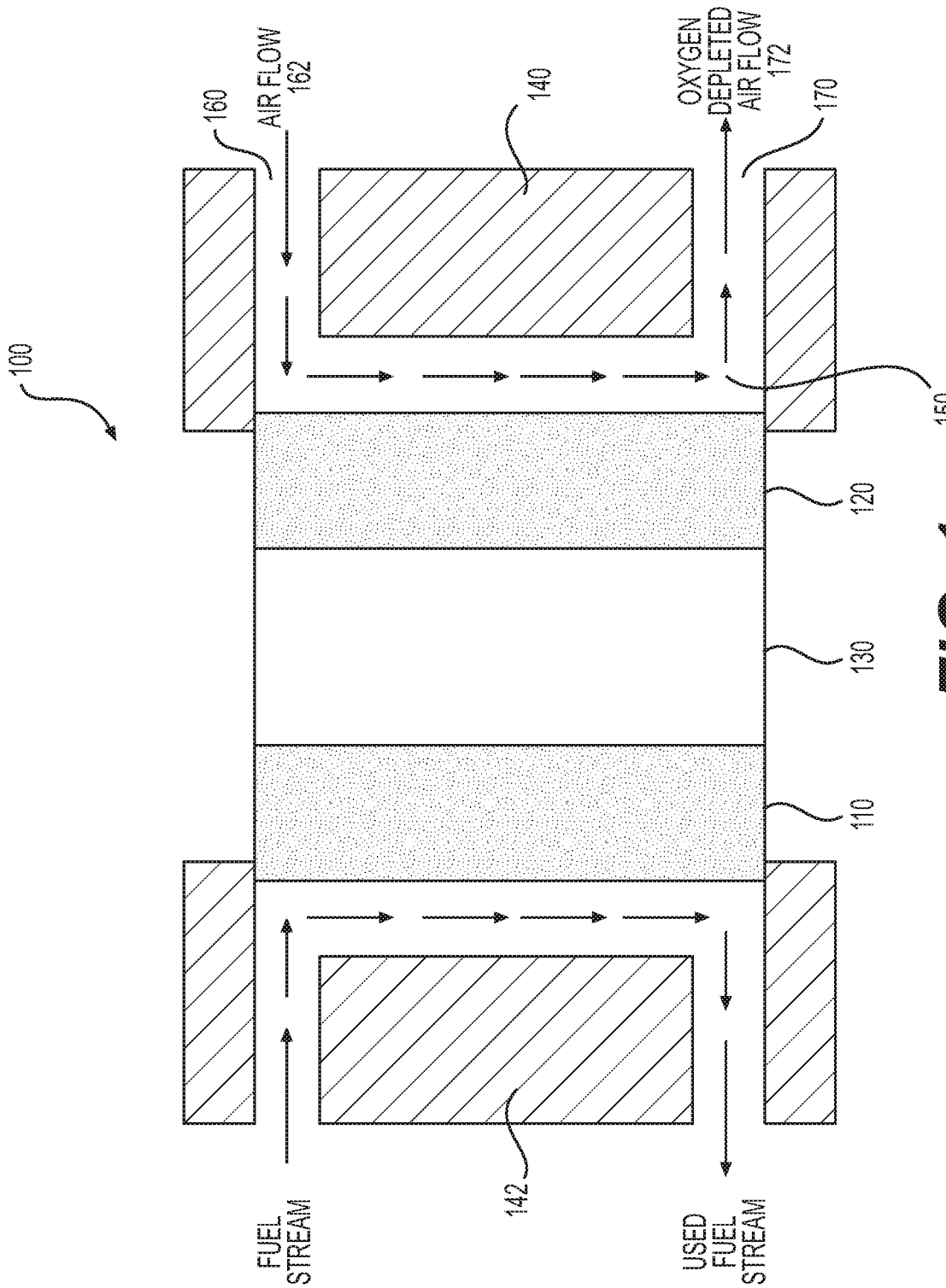
FIG. 1 is a partial cross-sectional view of a fuel cell, according to an exemplary embodiment.

FIG. 1 is a partial cross-sectional view of a fuel cell 100, according to an exemplary embodiment. Fuel cell 100 may convert the chemical energy of a fuel (e.g., hydrogen, natural gas, methanol, gasoline, etc.) and an oxidant (e.g., air or oxygen) into electricity and produces heat and water. Fuel cell 100 may comprise an anode 110, a cathode 120, and an electrolyte 130 disposed between anode 110 and cathode 120. As shown in FIG. 1, anode 110 of fuel cell 100 may be supplied with a fuel stream and discharge a used fuel stream from anode 110. Although not shown in FIG. 1, fuel cell 100 may recirculate the used fuel stream in order to recycle unconsumed fuel, such as hydrogen.

Fuel cell 100 may further comprise two bipolar plates 140, 142 adjacent each of the electrodes. Bipolar plates may act as support plates, conductors, and may be configured to provide passages to the respective electrode surfaces of fuel cell 100 and passages for discharging used fuel and oxidant gases. For example, bipolar plate 140 may be configured to provide an inlet 160 to receive an air flow 162 comprising an oxidant, such as oxygen, a passage 150 to introduce air flow 162 to the surface of cathode 120 for electrochemical reaction, and an outlet 170 to discharge an output air flow 172 from fuel cell 100. In some embodiments, inlet 160 may be disposed near a first end of bipolar plate 140 and outlet 170 may be disposed near a second end of bipolar plate 140. It will be understood that inlet 160 and outlet 170 may be located at other positions with respect to bipolar plate 140. Inlet 160 and outlet 170 may have any suitable width, cross-sectional area, depth, shape, and/or configuration. While fuel cell 100 has a total of four inlets and outlets depicted in FIG. 1, it will be understood that a greater or lesser number of inlets and outlets may be provided.

In some embodiments, inlet 160 of bipolar plate 140 may receive an ambient air flow 162 from the surrounding environment. The oxygen in air flow 162 supplied to cathode 120 via inlet 160 of bipolar plate 140 may be consumed by the electrochemical reaction taking place at cathode 120, producing an oxygen depleted air flow 172 discharged from outlet 170 of bipolar plate 140. The volume percentage and/or the concentration of oxygen in oxygen depleted air flow 172 may be less than that of air flow 162 supplied to cathode 120 due to the loss of oxygen consumed by the electrochemical reaction at cathode 120. The percentage and/or the concentration of oxygen in oxygen depleted air flow 172 may be, for example, less than about 1%, 2%, 3%, 4%, 5%, 6%, 7%, 8%, 9%, 10%, 12%, 14%, 16%, 18% A or 20%. In some embodiments, oxygen depleted air flow 172 may also contain water vapor produced by the electrochemical reaction at cathode 120 and in some embodiments water vapor supplied to cathode 120 as part of air flow 162.

Electrolyte 130 may be an ion-conducting material, such as a proton exchange membrane (PEM), which may comprise a pure polymer membrane or composite membrane where other material, for example, silica, heteropolyacids, layered metal phosphates, phosphates, and zirconium phosphates may be embedded in a polymer matrix. PEM may be permeable to protons while not conducting electrons. Anode 110 and cathode 120 may comprise porous carbon electrodes containing a catalyst layer. The catalyst material, for example platinum, may increase the electrochemical reaction taking place at anode 110 and/or cathode 120.

For the purposes of this description it will be assumed that fuel cell 100 is a PEM fuel cell. However, as described herein, this disclosure is not limited to PEM fuel cells. As is known in the art, for a PEM fuel cell, for example, hydrogen atoms may be electrochemically split into electrons and protons (hydrogen ions) at anode 110. The electrons produced by the electrochemical reaction flow through an electric load circuit (not shown in FIG. 1) to cathode 120, producing direct-current electricity. The protons produced by the electrochemical reaction at anode 110 diffuse through electrolyte or proton exchange membrane 130 to cathode 120. Electrolyte or proton exchange membrane 130 may prevent the passage of negatively charged electrons while allowing the passage of positively charged ions, for example, protons. Following passage through electrolyte or proton exchange membrane 130, the protons at cathode 120 may react with electrons that have passed through the electric load circuit and the oxygen of air flow 162 supplied to cathode 120 to produce heat and water.

Figure 2:
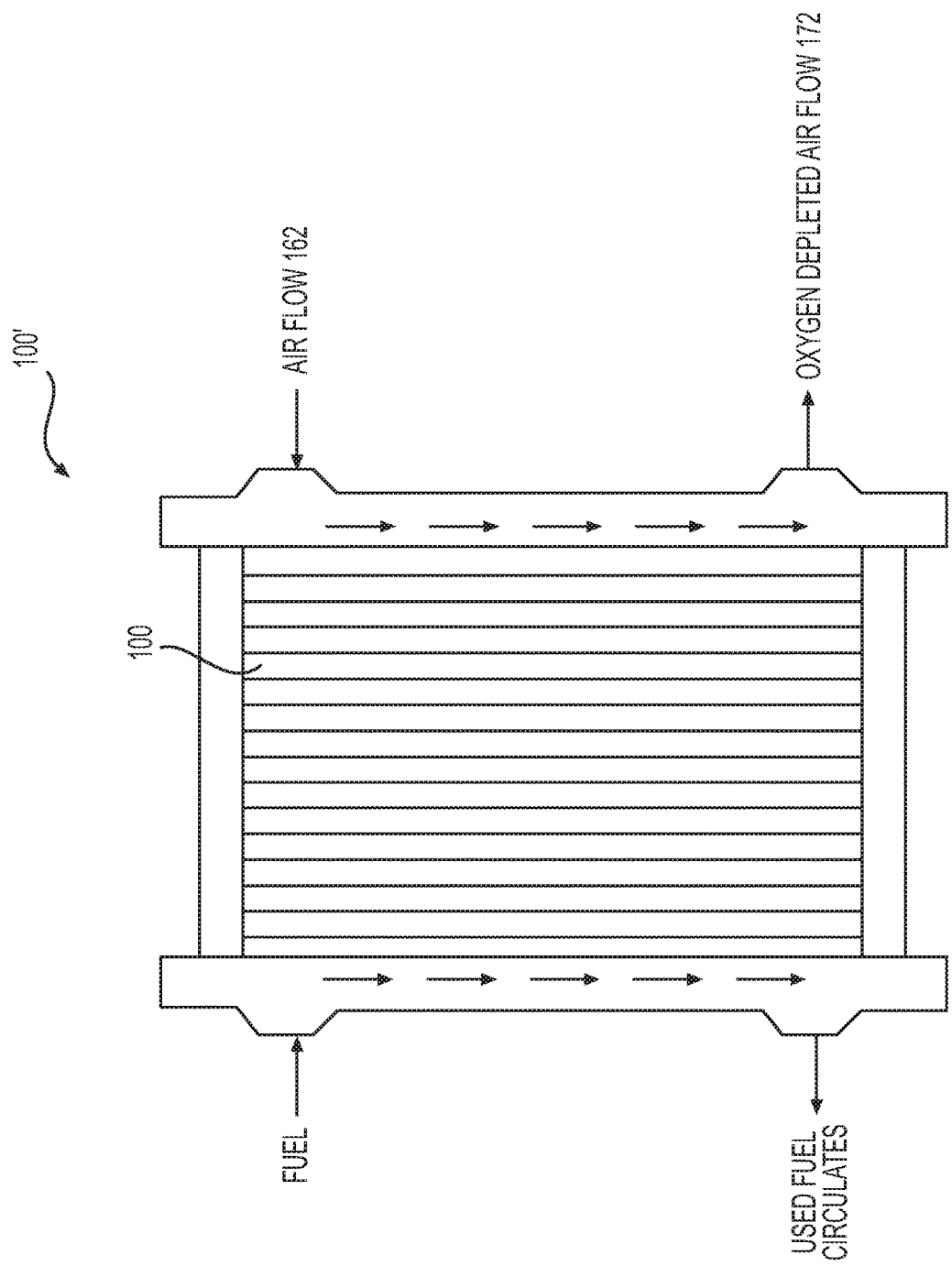
FIG. 2 is a schematic illustration of a fuel cell stack, according to an exemplary embodiment.

In some embodiments, a plurality of fuel cells 100 may be arranged in a stack, typically referred to as a fuel cell stack 100', as shown in FIG. 2. For example, fuel cell stack 100' may contain greater than 5, 10, 20, 25, 50, 100, or more fuel cells 100 connected electrically in series or in parallel in a manner commonly known in the art. In some embodiments, fuel cell stack 100' may include one or more inlet 160 to receive air flow 162, and one or more outlet 170 to discharge oxygen depleted air flow 172 from fuel cell stack 100'. In some embodiments, fuel cell stack 100' may include a plurality of bipolar plates, 140, 142, and a plurality of inlets 160 and/or outlets 170, which may correspond to the number of fuel cell 100. The following description may reference fuel cell 100, but it is understood that the embodiments described are also applicable to fuel cell stack 100'.

Typically, a certain amount of unconsumed oxygen remains in oxygen depleted air flow 172 discharged from outlet 170. As described herein, the "amount" may refer to the percentage, volume, volume percentage, mass, mass percentage, volume fraction, mass fraction, and/or concentration. According to some embodiments, to reduce the amount of oxygen remaining in oxygen depleted air flow 172, a minimum excess of oxygen in air flow 162 is preferably supplied to cathode 120 via inlet 160. In some embodiments, decreasing the flow rate of air flow 162 supplied to cathode 120 may decrease the amount of oxygen in oxygen depleted air flow 172. In other embodiments, decreasing the ratio between the amount of oxygen in air flow 162 supplied to cathode 120 and the amount of oxygen consumed by the electrochemical reaction at cathode 120, typically referred to as cathode stoichiometry, may reduce the amount of oxygen remaining in oxygen depleted air flow 172 and improve the effectiveness and thus quality of oxygen depleted air flow 172.

Furthermore, it is preferable to generate a volume of oxygen depleted air flow 172 from fuel cell 100 in a limited amount of time, and preferably a maximum volume. In some embodiments, for a given air flow rate and/or cathode stoichiometry, the volumetric flow rate of oxygen depleted air flow 172 generated by fuel cell 100 may increase as the current density at which fuel cell 100 is operated increases. Therefore, it may be preferable to operate fuel cell 100 at a high current density to generate and maximize the volumetric flow rate of oxygen depleted air flow 172.

In some embodiments, it may be advantageous to operate fuel cell 100 under optimized conditions, where the current density at which fuel cell 100 is operated is increased to the maximum and the flow rate of air flow 162 supplied to cathode 120 or the cathode stoichiometry of fuel cell 100 is decreased to the minimum. In some embodiments, under such optimized conditions, the amount of oxygen in oxygen depleted air flow 172 generated by fuel cell 100 may be optimized and/or minimized. In some embodiments, under such optimized conditions, the quality of oxygen depleted air flow 172 generated by fuel cell 100 may be optimized and/or maximized.

One of the challenges of operating fuel cell 100 or fuel cell stack 100' under the optimized conditions discussed above is the possible situation where hydrogen crosses from anode 110 to cathode 120 and constitutes a portion of oxygen depleted air flow 172. For example, when the flow rate of air flow 162 supplied to cathode 120 is reduced, the voltage of fuel cell 100, which is the electrical potential difference between cathode 120 and anode 110, may decrease due to low oxygen concentration at the cathode. In some situations, the voltage of fuel cell 100, or the voltages of a plurality of cells in a fuel cell stack 100' may decrease to a minimum threshold, at which protons may then be electrochemically transported or "pumped" through electrolyte or proton exchange membrane 130 from anode 110 to cathode 120 for fuel cell 100 or one or more cells in the fuel cell stack 100', while the electrons are rerouted around electrolyte or proton exchange membrane 130 (not shown in FIG. 1). At cathode 120, the transported protons and rerouted electrons are reduced to form hydrogen. Hydrogen is a highly combustible gas and therefore it is desirable to limit or eliminate its presence in oxygen depleted air flow 172. This is particularly desirable when oxygen depleted air flow 172 may be utilized, for example, for fire suppression applications. Furthermore, the presence of hydrogen in oxygen depleted air flow 172 may pose a safety hazard to the user of fuel cell 100 or fuel cell stack 100'. In some situations, it is also possible for holes to develop in proton exchange membrane 130 of PEM fuel cell 100 over its lifetime, allowing hydrogen to pass from anode 110 to cathode 120. For example, the presence of hydrogen in oxygen depleted air flow 172 discharged from cathode 120 may indicate formation of one or more holes in proton exchange membrane 130 of PEM fuel cell 100.

Embodiments of a fuel cell system consistent with the present disclosure may be preferably configured to generate oxygen depleted air flow 172, for example, by operatively controlling the flow rate of air flow 162 to cathode 120 to a minimum and/or the current density of fuel cell 100 to a maximum. In some embodiments, a fuel cell system consistent with the present disclosure may limit or eliminate hydrogen pumping in fuel cell 100 and/or the presence of hydrogen in oxygen depleted air flow 172 discharged from cathode 120.

Figure 3:
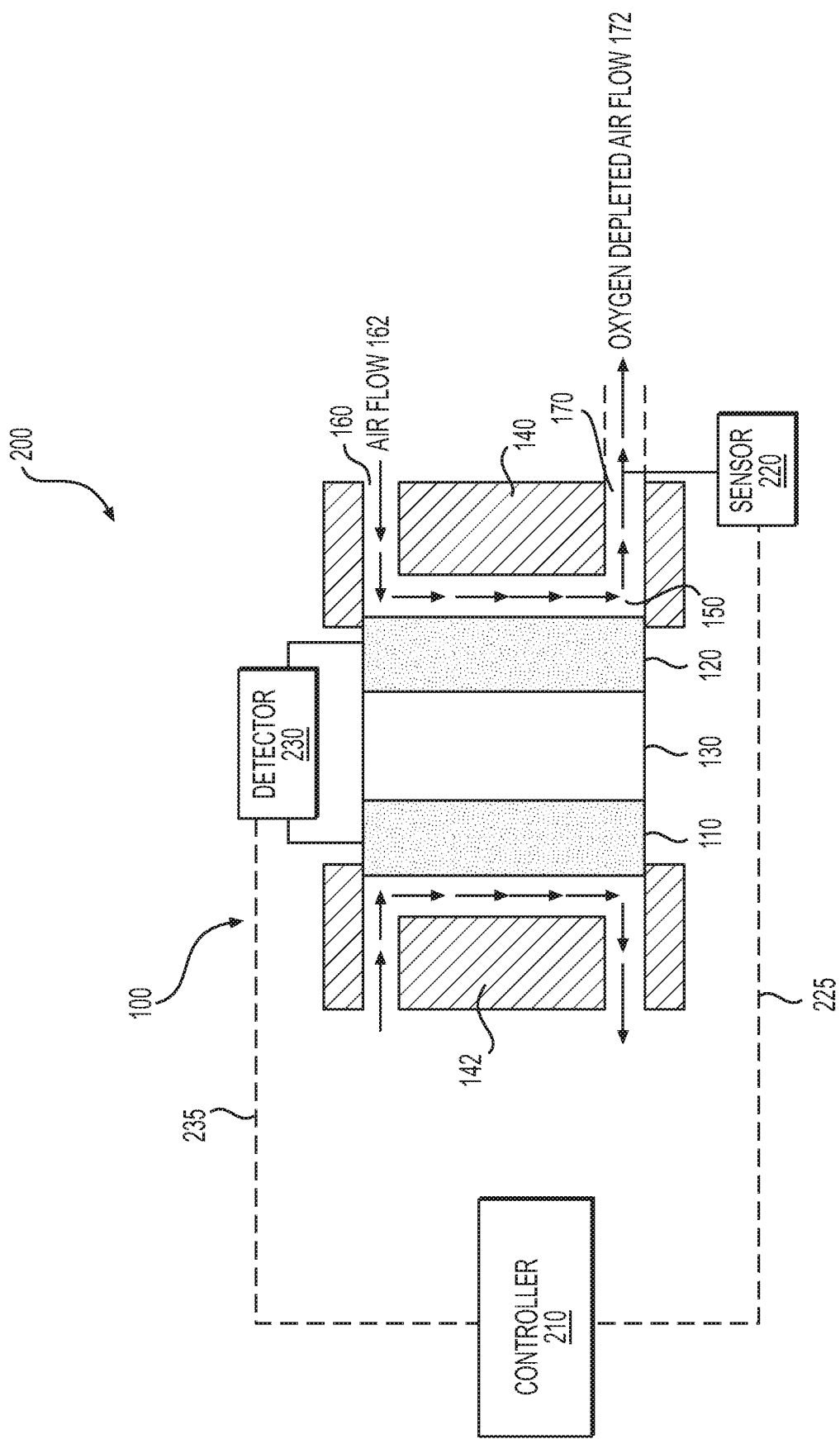
FIG. 3 is a schematic diagram of a fuel cell system, according to an exemplary embodiment.

FIG. 3 shows a schematic diagram of an exemplary embodiment of a fuel cell system 200 configured to generate oxygen depleted air flow 172. Fuel cell system 200 may include fuel cell 100 and a controller 210. In some embodiments, controller 210 may be configured to regulate the flow rate of air flow 162 to cathode 120. For example, controller 210 may be in communication with an air compressor, an air pump, or a fan feed, configured to supply air flow 162 to cathode 120, or a flow control valve configured to regulate air flow 162 to cathode 120. In some embodiments, the air compressor, the pump, or the fan feed may be electrically or mechanically coupled to a motor to operate at a speed sufficient to provide a desired flow rate to cathode 120 (not shown in FIG. 3). Controller 210 may send a command signal to the motor to adjust the speed of the air compressor, the pump, or the fan feed, and therefore regulate air flow 162 to cathode 120 to the desired flow rate. In other embodiments, a flow control valve may be electrically or mechanically coupled to an actuator and/or a positioner (not shown in FIG. 3). Controller 210 may send a command signal to the actuator and/or the positioner of the flow control valve to open or close the valve to regulate air flow 162 to cathode 120 to the desired flow rate. In some embodiments, by regulating the flow rate of air flow 162 to cathode 120, controller 210 may regulate the amount of oxygen in oxygen depleted air flow 172 discharged from cathode 120. For example, when controller decreases the flow rate of air flow 162 and oxygen of air flow 162 is consumed by the electrochemical reaction at cathode 120 at the same rate, the amount of oxygen remaining in oxygen depleted air flow 172 decreases.

In some embodiments, controller 210 may be configured to regulate the current density of fuel cell 100. For example, controller 210 may be in communication with a current regulator, a voltage regulator, a power regulator, and/or a circuit configured to adjust the current density of fuel cell 100 (not shown in FIG. 3). Controller 210 may send a command signal to the regulator, the voltage regulator, the power regulator, and/or the circuit to increase or decrease the current density of fuel cell 100 to a desired value. In some embodiments, by regulating the current density of fuel cell 100, controller 210 may regulate the volumetric flow rate of oxygen depleted air flow 172 generated by fuel cell 100. For example, when controller 210 increases the current density of fuel cell 100, the rate of electrochemical reaction at cathode 120 increases and therefore the volumetric flow rate of oxygen depleted air flow 172 increases.

According to some embodiments, fuel cell system 200 may include fuel cell stack 100', as shown in FIG. 2. Controller 210 may be configured to be in communication with one or more fuel cell 100 in fuel cell stack 100', and regulate the flow rate of air flow 162 to one or more inlet 160 separately or collectively. For example, controller 210 may be in communication with one or more air compressors, air pumps, or fan feeds, configured to supply air flow 162 to one or more fuel cell 100 in fuel cell stack 100', or one or more flow control valves configured to regulate air flow 162 to one or more fuel cell 100 in fuel cell stack 100'. In other embodiments, controller 210 may be configured to regulate the current density of one or more fuel cell 100 in fuel cell stack 100' separately or collectively. For example, controller 210 may be in communication with one or more current regulators, voltage regulators, power regulators, and/or circuits configured to adjust the current density of one or more fuel cell 100 in fuel cell stack 100'.

In some embodiments, as shown in FIG. 3, fuel cell system 200 may also include a sensor 220 configured to detect the presence of hydrogen and/or the amount of hydrogen in oxygen depleted air flow 172 discharged from outlet 170. In some embodiments, sensor 220 may be configured to be integral to bipolar plate 140 or may be positioned along a piping or conduit downstream of outlet 170.

Sensor 220 may be configured to generate a feedback signal indicative of the presence (e.g., a detection switch) or amount of hydrogen (e.g., an analog transmitter) in oxygen depleted air flow 172. Sensor 220 may be in communication with controller 210 and configured to transmit feedback signal 225 to controller 210. Based on feedback signal 225, controller 210 may be configured to detect and/or determine the presence or amount of hydrogen in oxygen depleted air flow 172. In some embodiments, fuel cell system 200 may include a plurality of sensors 220 that may generate a plurality of feedback signals 225 and controller 210 may detect and/or determine the presence or amount of hydrogen in oxygen depleted air flow 172 based on the plurality of feedback signals 225. In some embodiments, the plurality of sensors 220 may be configured to be integral to different positions of one or more bipolar plate 140 or may be distributed along a piping or conduit downstream of one or more outlet 170.

In some embodiments, sensor 220 may be analog transducers configured to be able to measure a range of percentage, concentration, or amount of hydrogen in oxygen depleted air flow 172 and generate corresponding feedback signal 225 indicative of the percentage, concentration, or amount of hydrogen measured. For example, a measurement range of sensor 220 may cover 0.01%-10.0% concentration or volume percentage of hydrogen. In other embodiments, sensor 220 may be a digital transducer, for example, a detection switch, which may detect only the presence or non-presence of hydrogen in oxygen depleted air flow 172 based on a certain threshold or limit and may generate corresponding feedback signal 225 indicative of whether hydrogen is present or not present. In some embodiments, sensor 220 may include a signal amplifier, an analogue-to-digital converter, a signal processor, a signal filtering circuit, and/or a noise cancellation circuit. It will be understood that any suitable hydrogen sensor may be employed to directly or indirectly detect or measure the presence of hydrogen in oxygen depleted air flow 172, including, for example, palladium-based sensors, optical fiber hydrogen sensors, electrochemical hydrogen sensors, MEMS hydrogen sensors, thin film hydrogen sensors, thick film hydrogen sensors, chemochromic hydrogen sensors, thermal catalytic and diode-based Schottky hydrogen sensors. In some embodiments, sensor 220 may be calibrated at the manufacturing factory and valid for the service life of the fuel cell. In other embodiments, sensor 220 may be re-calibrated and/or replaced during the life of the fuel cell.

In some embodiments, as shown in FIG. 3, fuel cell system 200 may include a detector 230. Detector 230 may be electrically connected to anode 110 and cathode 120. Detector 230 may be configured to detect a voltage value of fuel cell 100 and generate a feedback signal 235 indicative of the voltage value of fuel cell 100. Detector 230, for example, may comprise an analog voltmeter, a digital voltmeter, a multimeter, and/or an electronic test device. Detector 230 may be in communication with controller 210 and configured to transmit a feedback signal 235 to controller 210. Based on feedback signal 235 from detector 230, controller 210 may be configured to measure and/or determine the voltage value of fuel cell 100. In some embodiments, fuel cell system 200 may include a plurality of detectors 230 that may generate a plurality of feedback signals 235 indicative of one or more voltage values of fuel cell 100 or fuel cell stack 100'. For example, fuel cell system 200 having a plurality of fuel cells 100 may have a corresponding plurality of detectors 230 so that the voltage value of each fuel cell 100 may be monitored. Based on the plurality of feedback signals 235 transmitted from detectors 230, controller 210 may be configured to measure and/or determine one or more voltage values of each fuel cell 100. In other embodiments, based on the plurality of feedback signals 235, controller 210 may determine one or more algorithmically calculated voltage values of fuel cell 100.

Figure 4:
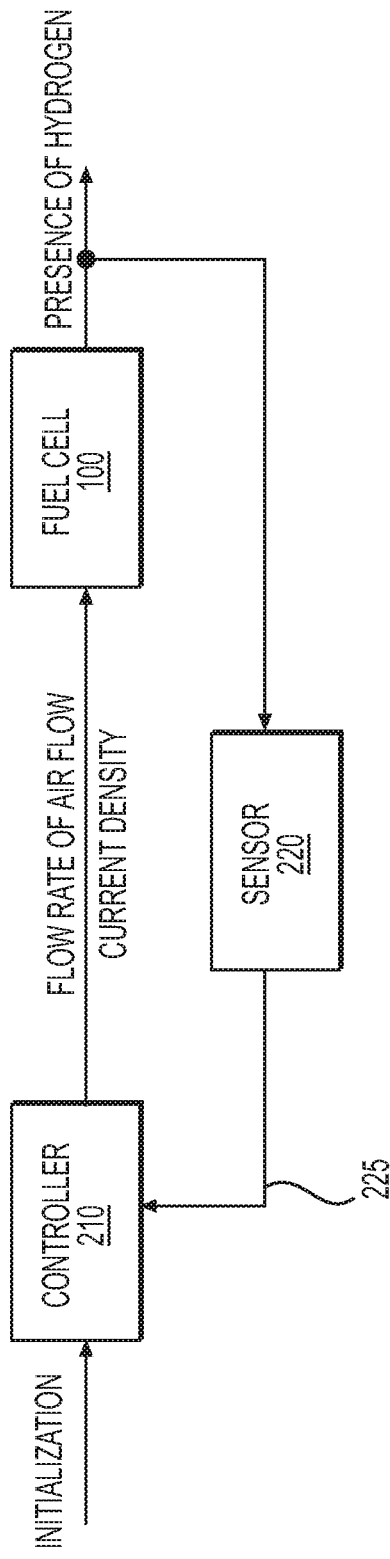
FIG. 4 is a flow diagram of control logic of the fuel cell system, according to an exemplary embodiment.

As shown in FIG. 4, controller 210 may be configured to selectively regulate the current density of fuel cell 100 and/or the flow rate of air flow 162 to cathode 120 based on the presence and/or amount of hydrogen in oxygen depleted air flow 172. For example, as shown in FIG. 4, sensor 220 may detect a presence and/or an amount of hydrogen in oxygen depleted air flow 172 and generate signal 225. Sensor 220 may transmit signal 225 to controller 210. Based on signal 225, controller 210 may selectively adjust the current density of fuel cell 100 and/or adjust the flow rate of air flow 162 to cathode 120. For example, in response to detecting a presence of hydrogen in oxygen depleted air flow 172, controller 210 may decrease the current density of fuel cell 100 and/or increase the flow rate of air flow 162 to cathode 120. In some embodiments, in response to the amount of hydrogen in oxygen depleted air flow 172, controller 210 may determine a preferable value of current density of fuel cell 100 and/or a preferable flow rate of air flow 162, and may decrease the current density of fuel cell 100 to the preferable value and/or increase the flow rate of air flow 162 to the preferable flow rate.

In some embodiments, controller 210 may determine an optimal and/or maximum operating value for the current density of fuel cell 100, for example, by increasing the current density until the presence or a certain amount of hydrogen beyond a threshold is detected by sensor 220 in oxygen depleted air flow 172. In other embodiments, controller 210 may determine an optimal and/or minimum operating value for the flow rate of air flow 162 to cathode 120, for example, by decreasing the flow rate of air flow 162 until the presence or a certain amount of hydrogen beyond a threshold is detected by sensor 220 in oxygen depleted air flow 172.

Figure 5:
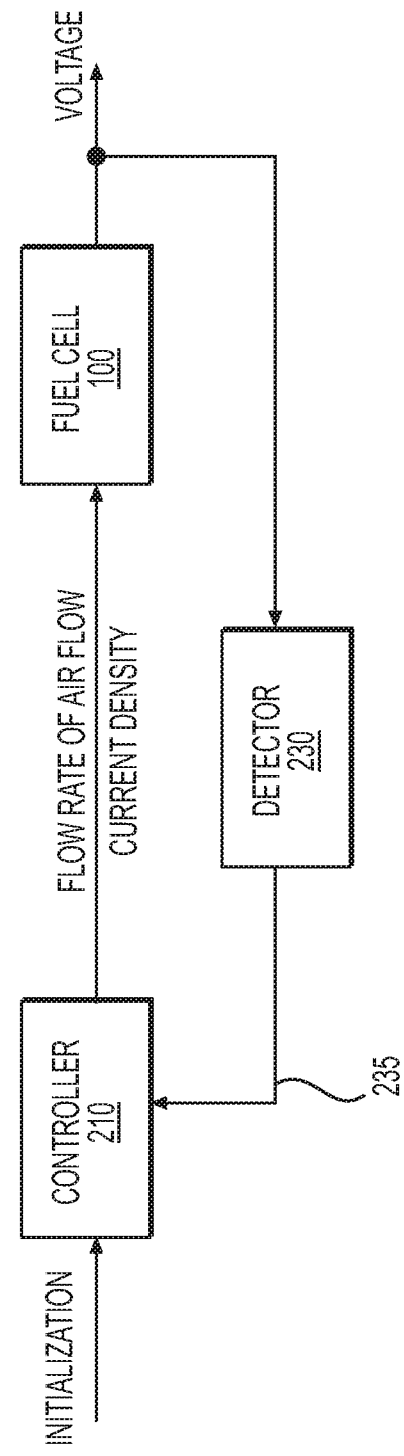
FIG. 5 is a flow diagram of control logic of the fuel cell system, according to another exemplary embodiment.

As shown in FIG. 5, controller 210 may also selectively regulate the current density of fuel cell 100 and/or the flow rate of air flow 162 to cathode 120 based on the detected voltage value of fuel cell 100. For example, as shown in FIG. 5, detector 230 may detect a voltage value of fuel cell 100 and generate signal 235. Detector 230 may transmit signal 235 to controller 210. Based on signal 235, controller 210 may selectively adjust the current density of fuel cell 100 and/or adjust the flow rate of air flow 162 to cathode 120. For example, when the voltage value of fuel cell 100 detected is lower than a minimum set point, at which hydrogen pumping may occur in fuel cell 100, controller 210 may decrease the current density of fuel cell 100 until the voltage value of fuel cell 100 is increased above the minimum set point. In another example, when the voltage value of fuel cell 100 detected is lower than the minimum set point, controller 210 may increase the flow rate of air flow 162 to cathode 120 until the voltage value of fuel cell 100 is increased above the minimum set point. In other embodiments, controller 210 may also be configured to regulate both the current density of fuel cell 100 and the flow rate of air flow 162 to cathode 120 in sequence or concurrently so that the voltage value of fuel cell 100 remains above the minimum set point.

Figure 6:
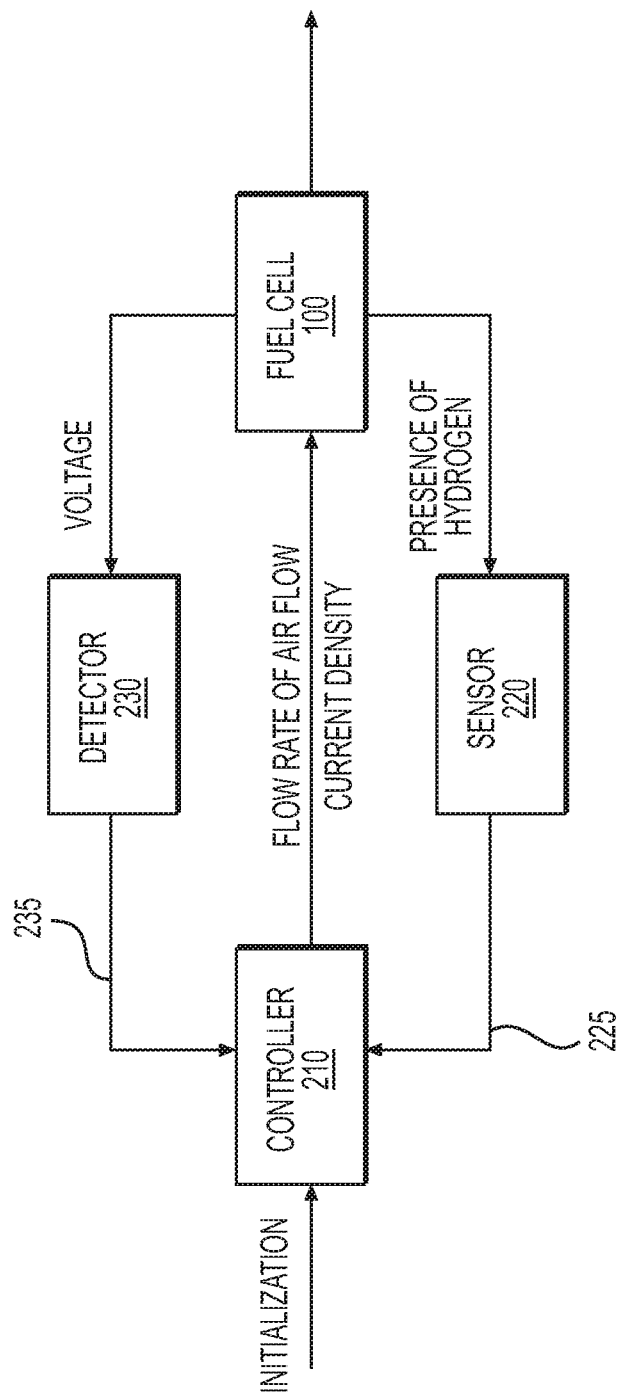
FIG. 6 is a flow diagram of control logic of the fuel cell system, according to another exemplary embodiment.
Figure 7:
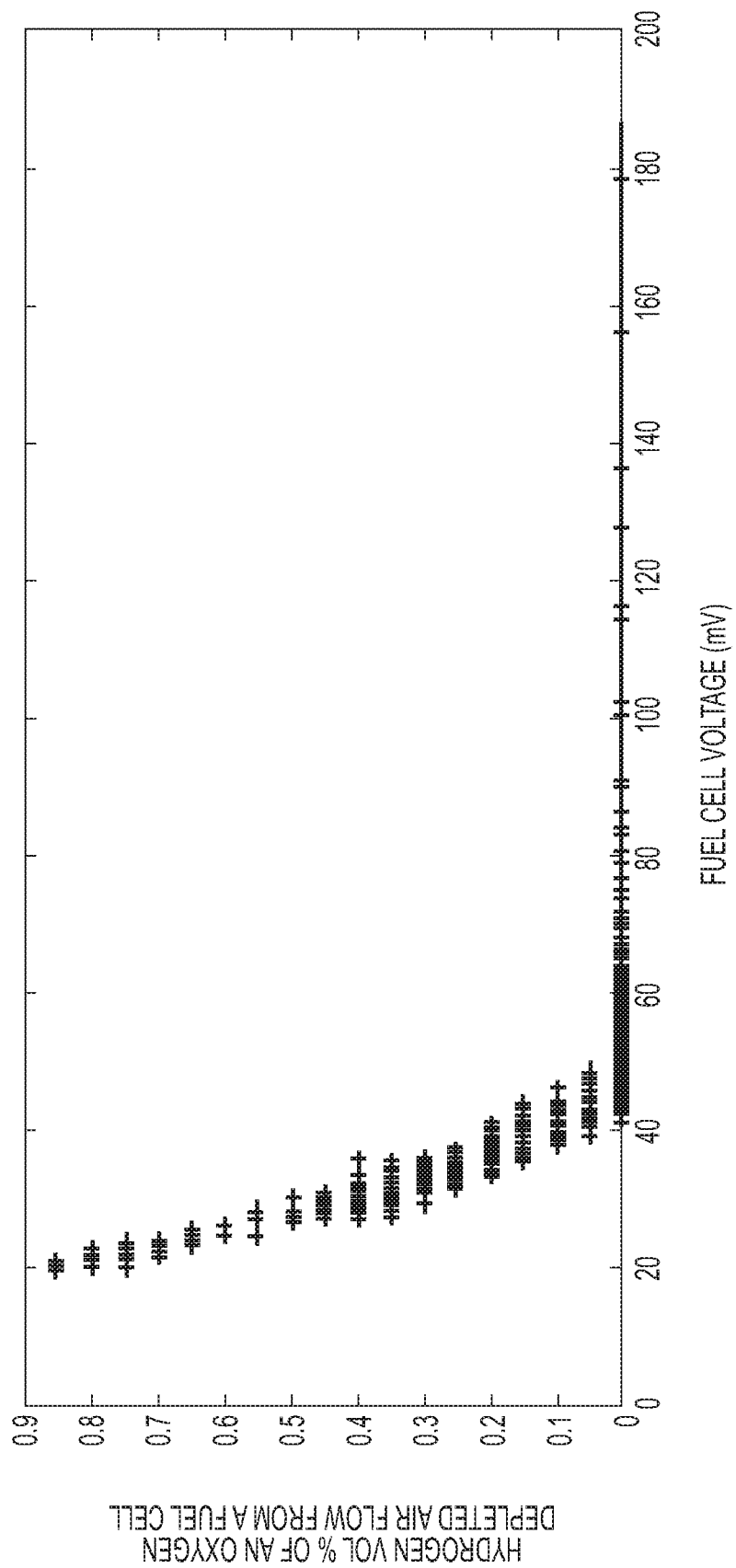
FIG. 7 is a graph of an exemplary data set of hydrogen volume percentage of an oxygen depleted air flow from a fuel cell vs. fuel cell voltage.

In some embodiments, as shown in FIG. 3, fuel cell system 200 may include both sensor 220 and detector 230. Controller 210 may be configured to be in communication with both sensor 220 and detector 230. For such embodiments, as shown in FIG. 6, controller 210 may receive both feedback signals 225 and 235 from sensor 220 and detector 230, and may selectively regulate the current density of fuel cell 100 and/or the flow rate of air flow 162 to cathode 120 based on both feedback signals. In some embodiments, controller 210 may be configured to determine a minimum operating set point or a minimum threshold of the voltage value of fuel cell 100 using both feedback signals. For example, as shown in FIG. 7, in one exemplary data set, controller may determine the minimum set point or the minimum threshold of the voltage value of fuel cell 100 by causing the voltage value to decrease and determining at which voltage value hydrogen starts to cross from anode 110 to cathode 120 and appear above a certain level or threshold in oxygen depleted air flow 172. As shown in FIG. 7, in this particular exemplary data set, as the voltage value decreases from 180 mV to 50 mV, there is no or little amount of hydrogen detected in oxygen depleted air flow 172. When the voltage value continues to decrease below 50 mV, the volume percentage of hydrogen in oxygen depleted air flow 172 begins to rise and registers at about 0.9% when the voltage value is reduced to about 20 mV. The minimum set point or the minimum threshold of the voltage value at which hydrogen begins to appear in oxygen depleted air flow 172 of fuel cell 100 may vary depending on the properties and the operation conditions of fuel cell 100. For example, the minimum set point or the minimum threshold of fuel cell 100 may range from about 0 to 1 volt, 0.01 volt to 1 volt, about 0.02 volt to 1 volt, about 0.03 volt to 1 volt, about 0.04 volt to 1 volt, about 0.05 volt to 1 volt, about 0.06 volt to 1 volt, about 0.07 volt to 1 volt, about 0.08 volt to 1 volt, about 0.09 volt to 1 volt, about 0.1 volt to 1 volt, about 0.2 volt to 1 volt, about 0.3 volt to 1 volt, 0.4 volt to 1 volt, 0.5 volt to 1 volt, 0.6 volt to 1 volt, 0.7 volt to 1 volt, 0.8 volt to 1 volt, or 0.9 volt to 1 volt.

In some situations, when the voltage value of fuel cell 100 is lower than the minimum set point or threshold, hydrogen pumping may occur in fuel cell 100 and hydrogen may appear in oxygen depleted air flow 172 from fuel cell 100. In such situations, sensor 220 may or may not detect the amount of hydrogen in oxygen depleted air flow 172. Sensor 220 may generate signal 225 and transmit signal 225 to controller 210. Based on signal 225, for example, if controller 210 detects a certain amount or concentration of hydrogen above a threshold level, controller 210 may decrease the current density of fuel cell 100 and/or increase the flow rate of air flow 162 to cathode 120 to limit or eliminate the presence of hydrogen in oxygen depleted air flow 172. For another example, if controller 210 does not detect hydrogen based on signal 225 even when the voltage value of fuel cell 100 is lower than the minimum set point, controller 210 may further increase the current density of fuel cell 100 and/or decrease the flow rate of air flow 162 to cathode 120, which may reduce the voltage value of fuel cell 100, in order to determine a lower minimum operating set point or threshold of the voltage value of fuel cell 100. On the other hand, when controller 210 does not detect hydrogen based on signal 225 even when the voltage value of fuel cell 100 is lower than the minimum set point, controller 210 may decrease the current density of fuel cell 100 and/or increase the flow rate of air flow 162 to cathode 120 to raise the voltage value to be above the minimum set point or the minimum threshold.

In other situations, when the voltage value of fuel cell 100 is higher than the minimum threshold, controller 210 may increase the current density of fuel cell 100 and/or decrease the flow rate of air flow 162 to cathode 120 to further reduce the amount of oxygen in oxygen depleted air flow 172, and in doing so, may decrease the voltage value of fuel cell 100. In such situations, controller 210, for example, may keep increasing the current density of fuel cell 100 and/or decreasing the flow rate of air flow 162 to cathode 120 until the voltage value of fuel cell 100 is reduced to about the minimum set point. When the voltage value of fuel cell 100 is not lower than the minimum threshold, for example, sensor 220 may also be configured to detect the presence or amount of hydrogen in oxygen depleted air flow 172, generate signal 225, and transmit signal 225 to controller 210. Based on signal 225, for example, controller 210 may detect the amount of hydrogen in oxygen depleted air flow 172 of fuel cell 100. For example, if controller 210 detects a certain amount or concentration of hydrogen above a threshold even if the voltage value of fuel cell 100 is above the minimum set point, controller 210 may decrease the current density of fuel cell 100 and/or increase the flow rate of air flow 162 to cathode 120 to limit or eliminate the presence of hydrogen in oxygen depleted air flow 172. Controller 210 may further determine a higher minimum operating set point or threshold of the voltage value of fuel cell 100. For another example, if controller 210 does not detect presence of hydrogen in oxygen depleted air flow 172, controller may not regulate the current density of fuel cell 100 and/or the flow rate of air flow 162 to cathode 120 until controller 210 detects presence of hydrogen from feedback signal 225.

According to some embodiments, fuel cell system 200 may include fuel cell stack 100', as shown in FIG. 2. Due to possible cell-to-cell variations in geometry, chemical, and/or physical properties under certain operational conditions, such as temperature and humidity, the voltage of each fuel cell 100 in fuel cell stack 100' may be detected at a different value. In some embodiments, the voltage of one or more of fuel cell 100 in the fuel cell stack 100' may be below the minimum set point or minimum threshold, at which hydrogen pumping may occur for one or more fuel cell 100, constituting collectively a portion of oxygen depleted air flow 172. In order to limit or eliminate the presence of hydrogen in oxygen depleted air flow 172 generated by fuel cell stack 100', for example, controller 210 may be configured to increase the lowest voltage values of fuel cells 100 in fuel cell stack 100' to desired positive values above the minimum set point or minimum threshold. For example, controller 210 may selectively regulate the flow rate of air flow 162 to cathode 120 and/or the current density of fuel cell stack 100' similarly to the exemplary embodiments and situations described above.

In some embodiments, controller 210 may adjust the minimum set point or minimum threshold based on the number of cells in fuel cell stack 100'. In other embodiments, controller 210 may adjust the minimum set point or minimum threshold based on the number of fuel cells in fuel cell stack 100' that have low voltage values. This may be advantageous when some of the fuel cells in fuel cell stack 100' may have low voltage values, and thus have hydrogen pumping from the anode to the cathode while the others may not. Therefore, as the number of fuel cells increases in fuel cell stack 100', the amount of hydrogen generated from the fuel cells that have low voltage values may be diluted and decrease in oxygen depleted air flow 172. In these situations, higher amount of hydrogen may be allowable from a single fuel cell, and thus a lower minimum voltage set point or threshold may be allowed. Provided that a sufficient number of fuel cells comprise fuel stack 100', the amount of hydrogen in oxygen depleted air flow 172 from the fuel cells having low voltage values in fuel cell stack 100' may be diluted and reduced. In some situations, controller 210 may adaptively detect the voltage values of the fuel cells and determine the minimum set point or minimum threshold based on the number of fuel cells having low voltage values.

In some embodiments, sensor 220 may detect the presence or amount of hydrogen in oxygen depleted air flow 172 and generate feedback signal 225 and detector 230 may detect the voltage value of fuel cell 100 and generate feedback signal 235 in fuel cell system 200 at the about same time. For example, based on feedback signals 225 and 235, controller 210 may compare the detected voltage value to the minimum set point and also determine the presence or amount of hydrogen in oxygen depleted air flow 172. Under similar situations as described above, controller 210 may selectively regulate the current density of fuel cell 100 and/or the flow rate of air flow 162 to cathode 120 to decrease the amount of oxygen to a minimum while limiting or eliminating presence of hydrogen in oxygen depleted air flow 172 generated by fuel cell system 200.

In some embodiments, sensor 220 may be an oxygen sensor and may detect the amount or concentration of oxygen in oxygen depleted air flow 172 and generate feedback signal 225. Feedback signal 225 may be sent to controller 210. Under similar situations as described above, controller 210 may selectively regulate the current density of fuel cell 100 and/or the flow rate of air flow 162 to cathode 120 based on the concentration of oxygen detected by sensor 220 to decrease the amount of oxygen to a minimum.

Controller 210 may be configured to utilize a variety of feedback control schemes, for example, Proportional-Integral-Derivative control, adaptive control, optimal control, model predictive control, nonlinear control, or intelligent control. Additionally, controller 210 may embody, for example, one or more general microprocessors capable of controlling numerous functions of fuel cell system 200. Controller 210 may include a memory (e.g., a RAM), a secondary storage device (e.g., a ROM), a processor (e.g., a CPU), or any other components for executing programs to perform the disclosed functions of fuel cell system 200. Various other circuits may be associated with controller 210, such as power supply circuitry, signal conditioning circuitry, data acquisition circuitry, signal output circuitry, signal filtering circuitry, signal amplification circuitry, and other types of circuitry known in the art.

In some embodiments, controller 210, sensor 220, detector 230, and fuel cell 100 may be operatively coupled, via, e.g., a wireless or hard connection, and may continuously, periodically, or stochastically communicate detection, measurement, and/or instruction signals. In some embodiments, controller 210 may be further configured to adaptively regulate drying of fuel cell 100 based on the presence of hydrogen detected in oxygen depleted air flow 172. For example, controller 210 may be in communication with one or more humidity control units, fans, vacuum, water vapor generators, oxygen sensors, and/or humidity sensors, configured to regulate and/or detect the humidity or water vapor percentage of air flow 162 to fuel cell 100 and/or air flow 172 from fuel cell 100. In some embodiments, controller 210 may indicate to a user of the fuel cell system that hydrogen is detected and/or a voltage value less than a minimum threshold is measured, for example, by a visual or audible signal.

In some embodiments, sensor 220 and/or detector 230 may be configured to generate feedback signals 225 and 235 on a regular time interval automatically. In other embodiments, sensor 220 and/or detector 230 may be configured to generate feedback signals 225 and 235 upon a request from controller 210. In some embodiments, sensor 220 and/or detector 230 may be calibrated or adjusted based on one or more of the operational condition of the fuel cell system, for example temperature, humidity, pressure, and current density. Accordingly, one or more additional measurement devices may be included in the fuel cell system in order to measure any suitable parameter of the operational conditions, for example, a pressure gauge, a thermometer, a humidity sensor, or other suitable devices.

Fuel cell system 200 as described herein may enable control of one or more fuel cell 100 such that an optimized and/or maximized quality and volume of oxygen depleted air flow 172 is generated and discharged from cathode 120 for its applications, such as fire suppression applications. Oxygen depleted air flow 172 generated by fuel cell system 200 may be collected and delivered to a supplier or a consumer of the oxygen depleted air, for example, immediately after collection or after a period of storage time. Consumers may use the oxygen depleted air for any suitable use, including for suppressing or preventing a fire, extinguishing a fire, or slowing oxidation of chemicals or materials. In some embodiments, oxygen depleted air flow 172 may be circulated and/or flood a space to achieve a certain concentration or percentage of total volume of air in the space. In other embodiments, oxygen depleted air flow 172 may be applied locally to extinguish a fire or to surround an object in a fire. In addition, oxygen depleted air flow 172 may be collected and then stored and packaged in suitable storage containers during transportation, storage, and usage. The suppliers and consumers may be the same entity, for example, a retailer or manufacturer may produce its own oxygen depleted air for its own usage. A maximum concentration or amount of oxygen in the oxygen depleted air may be set by an industry standard, e.g., the NFPA Standard for Clean Agent Fire Extinguishing Systems, standards for hypoxic air fire prevention systems, or may be dictated at least in part by the needs of consumers, for example. In some instances, for example, the volume percentage of oxygen in the oxygen depleted air may be less than about 0.5%, 1%, 2%, 3%, 4%, 5%, 6%, 7%, 8%, 9%, 10%, 12%, 14%, 16%, 18% or 20%.

Figure 8:
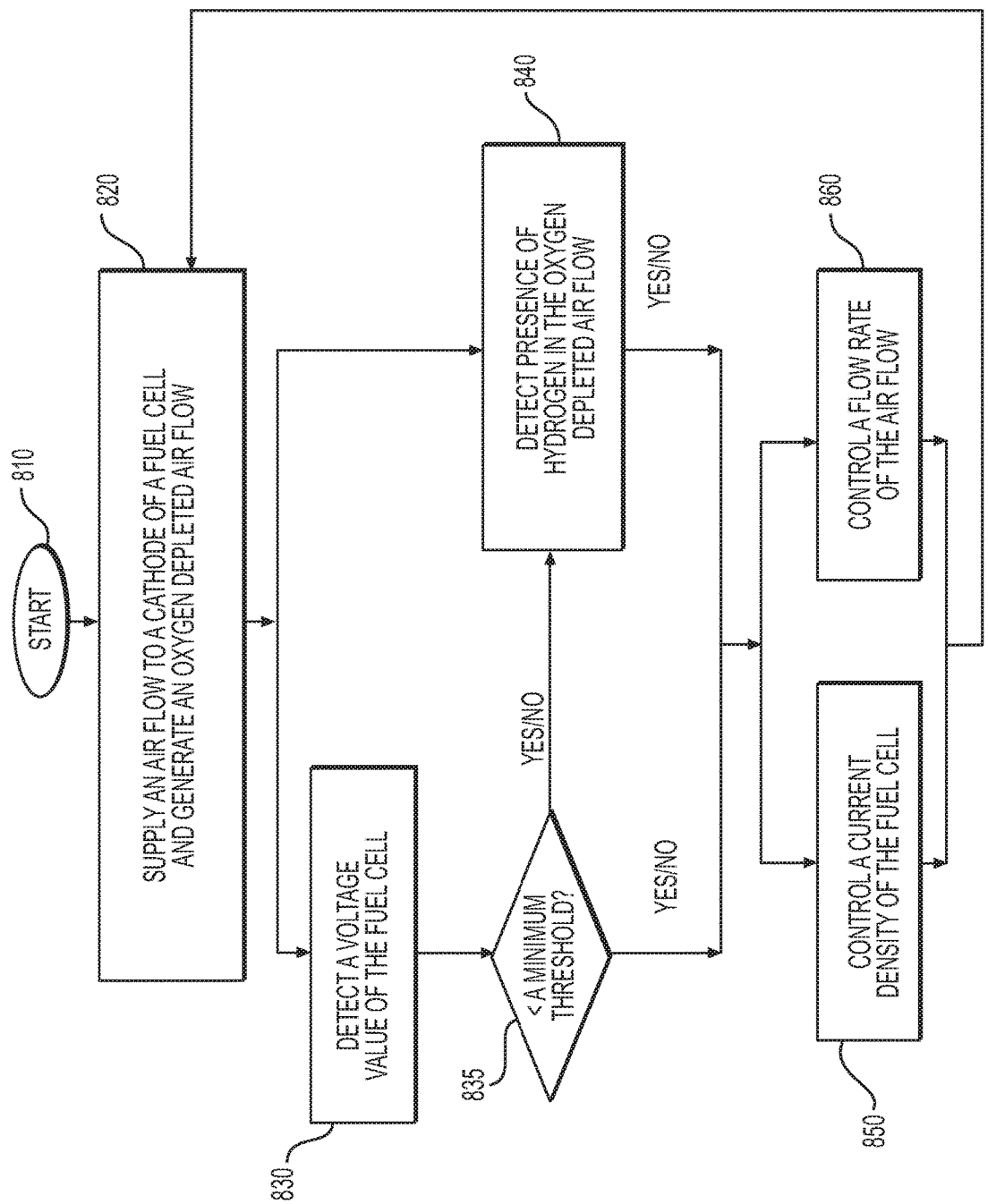
FIG. 8 is a flow chart of methods of generating an oxygen depleted air flow, according to exemplary embodiments.

FIG. 8 shows a flow chart of steps that controller 210 may execute to generate oxygen depleted air flow 172 by controlling fuel cell system 200, according to exemplary embodiments. A first method may comprise steps 810, 820, 840, 850, and/or 860. Step 810 may comprise system initialization operations, for example, connecting to a power source or measuring and setting up operational conditions, such as temperature, humidity, and initial current density. In some embodiments, step 810 may comprise determining a minimum set point or threshold of the voltage value of fuel cell 100 by decreasing the flow rate of air flow 162 to cathode 120 while detecting presence of hydrogen in oxygen depleted air flow 172 discharged from cathode 120. The minimum set point may be determined at which hydrogen starts to cross from anode 110 to cathode 120 and appear above a certain level or threshold in oxygen depleted air flow 172, as shown in exemplary data set in FIG. 7. Step 820 may comprise supplying air flow 162 to cathode 120 of fuel cell 100, wherein air flow 162 may comprise certain amount of oxygen. As fuel cell 100 is generating oxygen depleted air flow 172, step 840 may comprise detecting the presence or amount of hydrogen in oxygen depleted air flow 172 discharged from cathode 120. In some situations, when hydrogen is detected, controller 210 may proceed to step 850 and/or step 860. Step 850 may comprise controlling the current density of fuel cell 100 and step 860 may comprise controlling the flow rate of air flow 162 to cathode 120 in order to reduce or eliminate the presence of hydrogen in oxygen depleted air flow 172. For example, step 850 may decrease current density of fuel cell 100 and step 860 may increase the flow rate of air flow 162 to cathode 120 until hydrogen is not detected or eliminated. In other situations, when hydrogen is not detected, controller 210 may increase the current density of fuel cell 100 and/or decrease the flow rate of air flow 162 to cathode 120 until hydrogen is detected.

According to another exemplary embodiment, a second method of operation for controller 210 may comprise steps 810, 820, 830, 835, 850 and/or 860. Steps 810 and 820 may be implemented as described above. Step 830 may comprise detecting the voltage value of fuel cell 100 as fuel cell 100 generates oxygen depleted air flow 172. Step 835 may comprise comparing the voltage value detected to a minimum voltage set point or minimum threshold. If the voltage value is below a minimum set point or threshold, controller 210 may proceed to step 850 and/or step 860, which may be similarly implemented as described above. For example, step 850 may decrease current density of fuel cell 100 and step 860 may increase the flow rate of air flow 162 to cathode 120 in order to increase the voltage value of fuel cell 100 to be above the minimum set point. If the voltage value is above a minimum set point or threshold, for example, controller 210 may proceed to step 850 and/or step 860, wherein step 850 may increase current density of fuel cell 100 and step 860 may decrease the flow rate of air flow 162 to cathode 120 in order to decrease the amount of oxygen in oxygen depleted air flow 172. By doing so, controller 210 may decrease the voltage value of fuel cell 100 and/or update a new minimum set point or threshold for the voltage value of fuel cell 100. Controller 210 may alternatively, for example, not proceed to step 850 and/or 860 if the voltage value of fuel cell 100 detected is above the minimum set point or threshold.

According to another exemplary embodiment, a third method of operation for controller 210 may comprise steps 810, 820, 830, 835, 840, 850 and/or 860. Steps 810, 820, 830, and 835 may be similarly implemented as described above. At step 835, if the voltage value detected is lower than the minimum set point or threshold, controller 210 may proceed to step 840 to detect the presence or amount of hydrogen in oxygen depleted air flow 172 discharged from cathode 120. At step 840, if hydrogen is detected, for example, controller 210 may proceed to step 850 and/or step 860, wherein step 850 may decrease current density of fuel cell 100 and step 860 may increase the flow rate of air flow 162 to cathode 120 in order to reduce or eliminate presence of hydrogen in oxygen depleted air flow 172. If hydrogen is not detected, for example, controller 210 may also proceed to step 850 and/or step 860, wherein step 850 may increase current density of fuel cell 100 and step 860 may decrease the flow rate of air flow 162 to cathode 120 in order to decrease the amount of oxygen in oxygen depleted air flow 172. By doing so, controller 210 may decrease the voltage value of fuel cell 100 and update a new minimum set point or threshold for the voltage value of fuel cell 100. Controller 210 may alternatively, for example, not proceed to step 850 and/or 860 if hydrogen is not detected.

On the other hand, at step 835, for example, if the voltage value detected is not lower than the minimum set point or threshold, controller 210 may also proceed to step 840 to detect the presence of hydrogen in oxygen depleted air flow 172, based on which controller 210 may proceed to step 850 and/or step 860. For example, if hydrogen is detected in oxygen depleted air flow 172 at step 840, controller 210 may proceed to step 850 and/or step 860 to decrease the current density of fuel cell 100 and/or increase the flow rate of air flow 162 to cathode 120 to limit or eliminate the presence of hydrogen in oxygen depleted air flow 172. Controller 210 may further determine a higher minimum operating set point or threshold of the voltage value of fuel cell 100. For another example, if hydrogen is not detected in oxygen depleted air flow 172 at step 840, controller may not proceed to step 850 and/or step 860 until the presence of hydrogen is detected at step 840.

In some embodiments, controller 210 may combine any two of or all of the exemplary methods discussed above. For example, steps 830 and 840 may be executed in sequence, in parallel, or selectively in the exemplary methods described above. In some embodiments, as shown in FIG. 8, by controlling the flow rate of air flow 162 to cathode 120 at step 850, controller 210 may regulate the amount of oxygen in oxygen depleted air flow 172 generated at step 820. For example, decreasing the flow rate of air flow 162 at step 850 may decrease the amount or concentration of oxygen in oxygen depleted air flow 172 generated at step 820. In other embodiments, by controlling the current density of fuel cell 100 at step 860, controller 210 may regulate the volumetric flow rate of the oxygen depleted air flow 172 from cathode 120. For example, increasing the current density of fuel cell 100 at step 860 may increase the amount of oxygen depleted air flow 172 generated at step 820.

In some embodiments, upon sensing a low voltage or presence of hydrogen in oxygen depleted air flow 172, controller 210 may activate an air purge including a temporary increase in the air flow supplied to the cathode until either the voltage of fuel cell 100 or fuel cell stack 100' increases or hydrogen concentration in oxygen depleted air flow 172 decreases to an acceptable threshold. In some embodiments, the air purge may also include a fixed-time purge with a fixed air flow rate or an air flow rate tuned based on other parameters, such as hydrogen concentration in oxygen depleted air flow 172 or the voltage of fuel cell 100 or fuel cell stack 100'. In some situations, the air purge may remove a water blockage from a gas flow channel restricting the air flow to a given fuel cell. After removal of the water blockage, the fuel cell may be able to produce a higher volumetric flow rate of oxygen depleted air by further increasing the current density, and the quality of the oxygen depleted air from the fuel cell may be improved by reducing air flow and thus decreasing the residual oxygen concentration in oxygen depleted air flow 172 from the cathode.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A fuel cell system comprising:
   a fuel cell having an anode, a cathode, and an electrolyte positioned between the anode and the cathode, the cathode configured to receive an air flow and discharge an oxygen depleted air flow;
   a sensor configured to generate a first signal indicative of a presence of hydrogen in the oxygen depleted air flow; and
   a controller in communication with the sensor and the fuel cell, wherein the controller is configured to:
   detect the presence of hydrogen in the oxygen depleted air flow based on the first signal;
   in response to detecting the presence of hydrogen in the oxygen depleted air flow, selectively cause a current density of the fuel cell to decrease and/or increase a flow rate of the air flow to the cathode;
   determine a maximum value for the current density of the fuel cell by increasing the current density until the presence of hydrogen is detected in the oxygen depleted air flow; and
   determine a minimum value for the flow rate of the air flow to the cathode by decreasing the flow rate until the presence of hydrogen is detected in the oxygen depleted air flow.

2. The fuel cell system of claim 1, wherein the controller is configured to regulate a concentration of oxygen in the oxygen depleted air flow by regulating the flow rate of the air flow to the cathode.

3. The fuel cell system of claim 1, wherein the controller is configured to regulate a volumetric flow rate of the oxygen depleted air flow by regulating the current density of the fuel cell.

4. The fuel cell system of claim 1, further comprising a detector configured to generate a second signal indicative of a voltage value of the fuel cell, wherein:
   the detector is in communication with the controller; and
   the controller is configured to regulate at least one of the current density of the fuel cell and the flow rate of the air flow to the cathode so that the voltage value of the fuel cell remains above a minimum set point.

5. The fuel cell system of claim 1, wherein the electrolyte is a proton exchange membrane and the presence of hydrogen indicates the formation of a hole in the proton exchange membrane.

6. The fuel cell system of claim 1, wherein the controller is configured to run a feedback control scheme, utilizing at least one of Proportional-Integral-Derivative control, adaptive control, optimal control, model predictive control, non-linear control, and intelligent control.

7. The fuel cell system of claim 1, wherein the controller is configured to adaptively regulate drying of the fuel cell based on the first signal.

8. The fuel cell system of claim 1, wherein the controller is configured to:
   detect the presence of hydrogen in the oxygen depleted air flow based on the second signal; and
   in response to detecting the presence of hydrogen in the oxygen depleted air flow, selectively cause the current density of the fuel cell to decrease and/or increase the flow rate of the air flow to the cathode.

9. A method of generating an oxygen depleted air flow, comprising:
   supplying an air flow to a cathode of a fuel cell, wherein the air flow is transformed to an oxygen depleted air flow by electrochemical reactions in the fuel cell;
   detecting a presence of hydrogen in the oxygen depleted air flow discharged from the cathode;
   controlling a current density of the fuel cell and/or a flow rate of the air flow to the cathode based on the detected presence of hydrogen in the oxygen depleted air flow;

determining a maximum value for the current density of the fuel cell by increasing the current density until the presence of hydrogen is detected in the oxygen depleted air flow; and determining a minimum value for the flow rate of the air flow to the cathode by decreasing the flow rate until the presence of hydrogen is detected in the oxygen depleted air flow.

10. The method of claim 9, further comprising controlling a concentration of oxygen in the oxygen depleted air flow by controlling the flow rate of the air flow to the cathode.

11. The method of claim 9, further comprising controlling a volumetric flow rate of the oxygen depleted air flow by controlling the current density of the fuel cell.

12. The method of claim 9, further comprising:
detecting a voltage value of the fuel cell; and
regulating at least one of the current density of the fuel cell and the flow rate of the air flow to the cathode so that the voltage value remains above a minimum set point.

13. The method of claim 9, further comprising supplying the oxygen depleted air flow to a fire suppression system.

14. A fuel cell system comprising:
a fuel cell having an anode, a cathode, and an electrolyte positioned between the anode and the cathode, the cathode configured to receive an air flow and discharge an oxygen depleted air flow;
a detector configured to generate a first signal indicative of a voltage value of the fuel cell;
a sensor configured to generate a second signal indicative of presence of hydrogen in the oxygen depleted air flow; and
a controller in communication with the detector, the sensor, and the fuel cell, wherein the controller is configured to:
measure the voltage value of the fuel cell based on the first signal;
in response to the voltage value, selectively regulate a current density of the fuel cell and/or a flow rate of the air flow to the cathode;
determine a maximum value for the current density of the fuel cell by increasing the current density until the presence of hydrogen is detected in the oxygen depleted air flow; and
determine a minimum value for the flow rate of the air flow to the cathode by decreasing the flow rate until the presence of hydrogen is detected in the oxygen depleted air flow.

15. The fuel cell system of claim 14, wherein the controller is configured to regulate a concentration of oxygen in the oxygen depleted air flow by regulating the flow rate of the air flow to the cathode.

16. The fuel cell system of claim 14, wherein the controller is configured to regulate a volumetric flow rate of the oxygen depleted air flow by regulating the current density of the fuel cell.

17. The fuel cell system of claim 14, wherein the controller is configured to regulate a voltage value of the fuel cell above a minimum set point by regulating at least one of the current density of the fuel cell and the flow rate of the air flow to the cathode.

* * * * *